United States Patent [19]

Hicks

[11] Patent Number: 5,355,285

[45] Date of Patent: Oct. 11, 1994

[54] SURGEON'S HEADLIGHT SYSTEM

[76] Inventor: John W. Hicks, 312 Howard St., Northboro, Mass. 01532

[21] Appl. No.: 3,500

[22] Filed: Jan. 12, 1993

[51] Int. Cl.⁵ .................................................. F21V 8/00
[52] U.S. Cl. ..................................... 362/32; 362/105; 362/106; 362/804
[58] Field of Search .................. 362/32, 105, 106, 804

[56]  References Cited

U.S. PATENT DOCUMENTS

| | | | |
|---|---|---|---|
| 3,285,242 | 11/1966 | Wallace | 362/105 |
| 3,437,803 | 4/1969 | Seitz et al. | 362/105 |
| 3,745,993 | 7/1973 | Feinbloom | 362/105 |
| 3,830,230 | 8/1974 | Chester | 362/105 |
| 4,234,910 | 11/1980 | Price | 362/32 |
| 4,978,186 | 12/1990 | Mori | 362/32 |

Primary Examiner—Richard R. Cole
Attorney, Agent, or Firm—Samuels, Gauthier & Stevens

[57] ABSTRACT

A surgeons headlight system which comprises a short arc xenon lamp in optical communication with a proximal end of a light pipe. The light pipe having beam shaping optics located at a distal end thereof. The light pipe also having a first long section which is fixed in an elevated manner and a second tethered section which defines, at least in part, an umbilical. The distal end of the light pipe which comprises the beam shaping optics being supported solely by the surgeons cap. The headlight system delivering illumination of not less than 2500 foot candles over a three inch diameter circle, and causing less than 10 grams of pull to the surgeons cap.

9 Claims, 6 Drawing Sheets

SURGEON'S HEADLIGHT SYSTEM

FIELD OF THE INVENTION

The invention embodies a head light system for surgeons.

BACKGROUND AND BRIEF SUMMARY OF THE INVENTION

Before 1970 surgeon's headlights comprised an incandescent bulb and some beam forming optics mounted on a headpiece fitted on the surgeon's head. They were much like a flashlight except the batteries were either spatially separated—not on the surgeon's head, or some other sort of power was supplied. The disadvantage of the bulb on the head was excess heat. Only about 2% of the power to the bulb was converted into useful projected beam illumination. The remainder heated the surgeon's head.

In the mid-seventies Applied Fiberoptics, Inc., of Southbridge, Mass., introduced a headlight system in which the incandescent light was removed from the surgeon's head. The light source was placed in a light source box and focused onto a fiberoptic "light pipe", which was an assembly of small glass fibers. This light pipe carried the illumination to the surgeon's forehead and an optical assembly formed a spot of light a couple of feet away.

The advantage of the this light pipe system was that the heat was dissipated somewhere else. Only the useful light was piped to the surgeon's head.

This light pipe is typically about 6 to 8 feet long and the actual cross section of the bundle of fibers is about 5 mm. The fibers are housed in a plastic jacket so the outside diameter of the pipe is about 10 mm.

The disadvantages of the light pipe system are the light pipe weighs about 270 grams and the weight increases with length. The short length tethers and confines the surgeon to a small area. The light pipe prevents anyone from walking in back of the surgeon. The headgear needs to hold the projected spot steady relative to the surgeon's head needs to be tightened fairly snug to prevent the pull of the pipe from moving it. After an hour or so the typical user has a headache.

The forces of the light pipe on the surgeon's head comprises a vertically downward force of about half the weight of the pipe and a force along the length due to the catenary. This increases dramatically as the arc gets tighter (straighter). Consequently, most surgeons allow the light pipe to drop down their back.

In the 'drape down the back' configuration every time the surgeon's head moves in the nod direction, the friction of the light pipe on the back pulls against this motion and is distracting.

The weight of the headgear to carry the light pipe is about 200 grams. When the headgear is secured to the surgeon's head, an inward force of between one to five pounds is applied. Depending upon the position of the surgeon and the shape of the arc of the light pipe, the pull on the headgear ranges between 100 to 250 grams. Also, and perhaps most annoyingly, when the surgeon's head moves, i.e. from a static through a dynamic moving poition, there is an additional force or pull of ±30 grams to overcome the friction of the light pipe on the back.

These light pipes gained wide acceptance but are universally disliked by surgeons.

The present invention is a headlight system that brings the light in with a pipe overhead and then the pipe drops vertically downward to the surgeon. The light pipe can go down somewhat and then loop up. When the excess length, the surgeon's position and the point of ceiling attachment are properly adjusted, there is little downward pull, little frictional pull against the back and almost no catenary pull. As a consequence, the prior art headgear need not be used with its associated weight. The light pipe and associated optics can be secured to any head cover but preferably they are secured to the typical sanitary cap commonly referred to as a cap. The cap need not be held so tightly on the head. There is very little force to move it around. Also, the invention eliminates the prior art headgear and its associated weight.

In addition to bringing the light pipe downwardly to the surgeon's cap from an elevated position, a light pipe is used which results in a pull on the surgeon's cap of less than one gram versus the prior art pull of between 100 to 250 grams. Further, there is, when realistically viewed, no additional pull felt when the surgeon's head is moved.

Broadly the invention comprises a system which includes a light pipe having proximal and distal ends. A source of illumination is placed at the proximal end and beam-shaping optics are placed at the distal end. The light pipe comprises two sections, a first long light pipe which comprises more than 50% of the light pipe, and preferably at least 70% of the total length; and a second tethered light pipe which extends downwardly from the long light pipe. The long light pipe section extends into the operating area and is secured in a fixed elevated position. The tethered section hangs downwardly from the long light pipe and defines in part an umbilical. The distal end is secured to the surgeon's cap which cap also supports beam-shaping optics.

It is impractical to secure the light pipe to the ceiling every time the surgeon puts on the headgear. The invention in one aspect provides a "joint" or "disconnect" in the tethered light pipe. This joint or disconnect defines in the tethered light pipe two sections, a depending light pipe which extends downwardly from the long light pipe and a disposable light pipe attached to the surgeon's cap. Typically there is four feet or less of disposable light pipe attached to the surgeon's cap.

The typical ceiling height in surgery is 9 feet or more. With a four foot umbilicus and a six foot high disconnect, the surgeon can move around in a circle of six foot radius which is more leeway than with the prior art system. Also, people can walk in back of the surgeon.

In implementing the system of this invention, I have found a short arc Xenon lamp (made by ORC and by ILC) has a bright enough spot such that all the light necessary can be carried in a 2 mm or less fiber pipe—as opposed to the 5 mm used before. In fact, with 1 mm diameter light pipe, a 4 inch diameter spot of illumination can be provided. With this 1 mm diameter light pipe, a single plastic fiber with no jacket can be used. The weight of this pipe per unit length is about 1/40th the weight of the typical old light pipe used for this purpose.

This weight is almost unnoticeable on the surgeon's head and the cap is almost undisturbed by the pull. This allows the new system to mount the headlight on the sanitary paper surgeon's cap that the surgeon wears.

In addition, the beam-shaping optics is scaled down in proportion to the fiber bundle size. That is for a 1 mm fiber all dimensions of the optics can be scaled down by a factor of 5 from the one used with a 5 mm bundle of fibers. This is not a trivial advantage. The old optical assembly stuck out so far that the surgeon could not wear an ordinary face shield. The assembly got in the way. The new lens assembly is so small that it doesn't interfere with the use of an ordinary face shield.

With the system of the invention, the features of down-sizing, the use of the sanitary cap and the use of the disconnect, result in so little material used that the cap, beam-shaping optics and disconnect light pipe can be sold and used as a disposable headlight system. Generally, the disposable headlight system of the invention (from the disconnect onward) can be manufactured at less than 1/50th the cost of the old light pipe and headgear.

The advantage of disposability is that the disposable headlight system can be provided in a sterile condition. The old system provided a pipe that could be and was actually autoclaved by the hospital. The headgear itself was not autoclavable and generally was never washed, let alone sterilized and became increasingly filthy with dried patient's blood as it was reused.

With the light source used with the invention, an area can be illuminated bright enough to serve six 1 mm diameter pipes. Therefore, another aspect of the invention is an assembly of fibers that separate into several light pipes. The heat generated at the bright spot is intense so it is advantageous to use glass fibers (rods) in this assembly.

The separate light pipes extend from the source to several operating rooms. It is preferable to provide at least two headlights per procedure.

Broadly the invention comprises a surgeon's headlight system which has a light source, a light pipe having a proximal end in optical communication with the light source and a distal end in communication with beam-shaping optics. The distal end and the beam-shaping optics are secured to a surgeon's sanitary cap. The light pipe comprises a first long light pipe section which is secured in a fixed elevated position above the expected level at which the surgeon's head will be and a second tethered section which depends from the long section and defines along its length, at least in part, an umbilical.

In a preferred embodiment, the tethered section is characterized by a quick disconnect which defines a depending light pipe and a disposable light pipe secured to the surgeon's cap.

In a particularly preferred embodiment, the system of the invention comprises a manifold in communication with the light source, a plurality of long light pipes extending from the manifold to a plurality of locations where they are secured to the surgeon's headgear.

In still another embodiment, the plurality of light pipes extending from the manifold comprise two sections, first long light pipe sections secured in an elevated position and second tethered sections, the tethered sections having disconnects.

DESCRIPTION OF THE PREFERRED EMBODIMENT(S)

Figure 1:
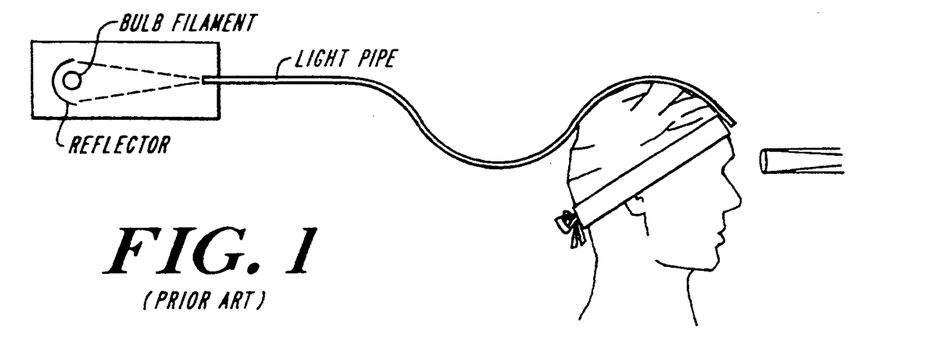
FIG. 1 is an illustration of a prior art surgeon's head light system.
Figure 2:
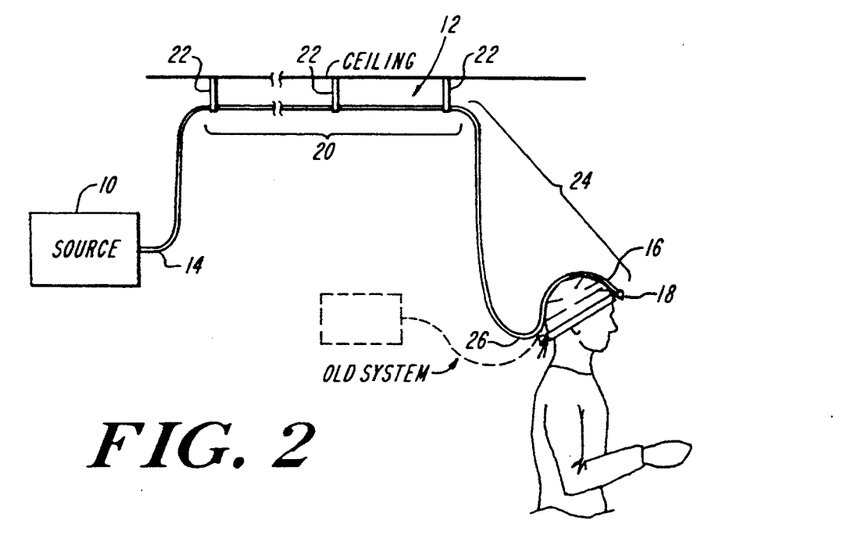
FIG. 2 is an illustration of a system embodying the invention with a portion of a prior art system shown in dotted lines.

Referring to FIG. 2, a system embodying the invention is shown with a source 10, preferably a Xenon light source having an intensity of about 15 to 20 million ft. candles over a 3½ mm diameter spot and a 1 mm light pipe 12, such as a plastic single fiber made by Hoescht Celanese #F200 with a core of polymethylmethacrylate and a cladding of fluorinated polymer, having a proximal end 14 in optical communication with the source 10 and a distal end 16 in optical communication with beam-shaping optics 18. The illumination delivered at the desired object illumination plane is 3000 to 4000 ft. candles the same as the prior art. A prior art source and light pipe is shown in dotted lines. The light pipe weights less than one gm/ft.

The light pipe 12 preferably comprises two sections, a first section 20 which comprises 50% and generally 70% or more of the total length of the light pipe 12. This section 20, hereinafter referred to as the long light pipe section, is secured by hangers 22 to a ceiling or other structure in a fixed elevated position. This position is such that personnel in an operating room can easily walk under this portion 20 without interference. The other section 24, hereinafter referred to as the tethered light pipe section, extends downwardly from the fixed section and forms in part an umbilical 26 and is secured to the surgeon's cap, as shown more clearly in FIG. 5. This tethered light pipe with the umbilical is adjusted to allow the surgeon approximately a 5 foot radius of movement without 'pulling' on the fixed section.

Figure 3A:
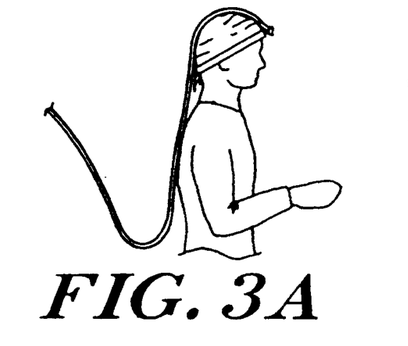
FIGS. 3a and 3b are illustrations of a prior art system in use.
Figure 3B:
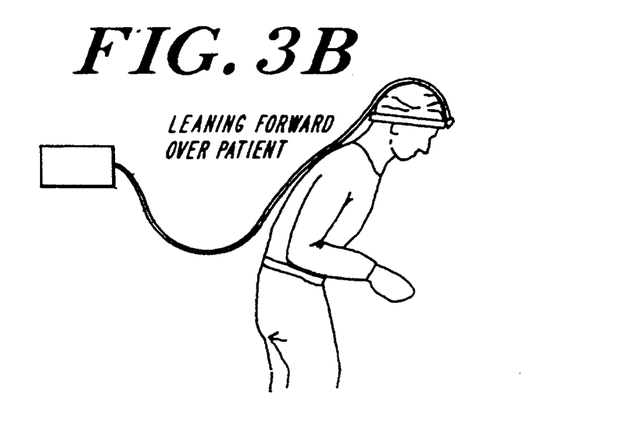

FIG. 3 illustrates a prior art system in use. In FIG. 3a, the pipe 'drapes down the back' of the surgeon. In FIG. 3b, the loop shortens and the pull on the headgear increases.

When the surgeon stands erect, FIG. 3a, the drag or pull caused by the light pipe varies between 100 grams to 130 grams. When the surgeon moves forward, FIG. 3b, the pull increases to 200 to 250 grams with a frictional pull of about 30 grams variation depending on whether the head nods forward or backward. It is the latter which is most annoying.

Figure 4A:
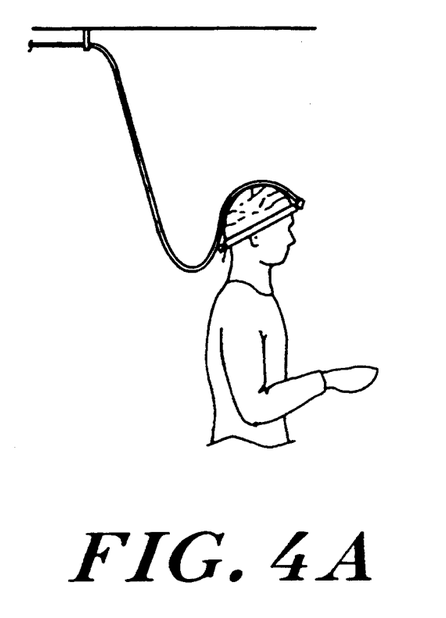
FIGS. 4a and 4b are illustrations of the system of the invention in use.
Figure 4B:
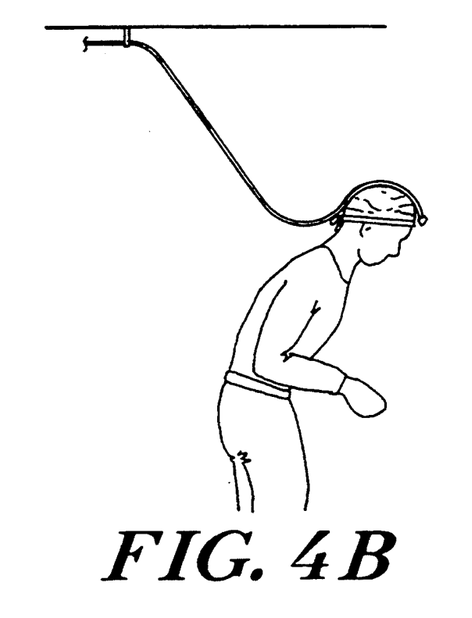

In the system of the invention, FIGS. 4a and 4b, delivering the same amount of illumination, the pull for the position of FIG. 4a is less than 1 gram and the pull for the position of FIG. 4b is less than 1 gram.

Figure 5:
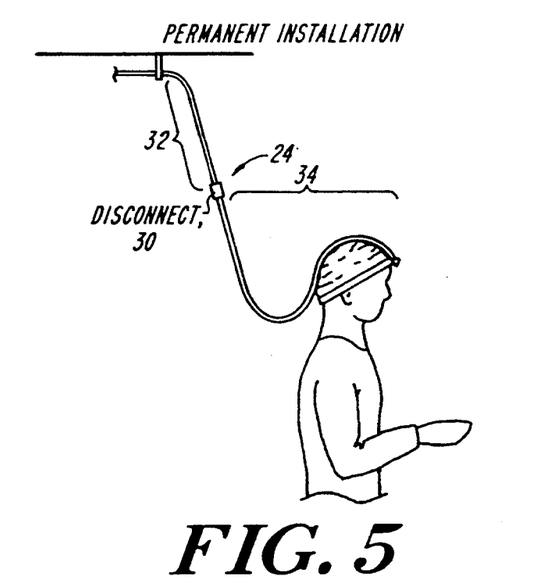
FIG. 5 is an illustration of the embodiment of the invention with a quick disconnect joining a long light pipe section and a tethered light pipe section.

In another aspect of the invention, referring to FIG. 5, a disconnect 24 is placed in the tethered light pipe. The disconnect 30 defines a depending light pipe 32 and a disposable light pipe 34.

Figure 6:
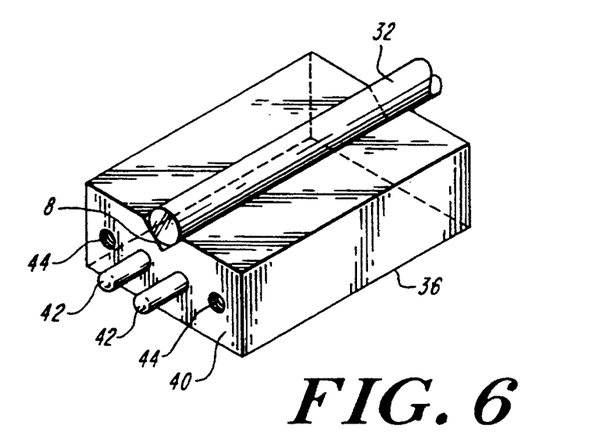
FIG. 6 is an illustration of a disconnect on the depending light pipe.

Referring to FIG. 6, a connector 36 is characterized by a V-shaped recess 38 and an abutting end face 40. The end face 40 is characterized by alignment pins 42 and tapped holes 44. Secured in the recess 38 is the light pipe 32. The end of the light pipe 32 is flush with the face 40.

Figure 7:
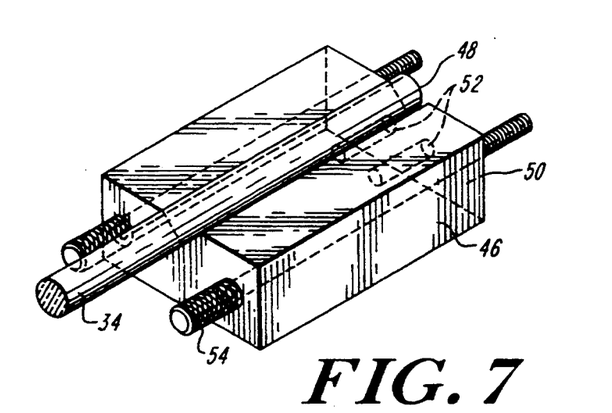
FIG. 7 is an illustration of a disconnect on the disposable light pipe.

Referring to FIG. 7, a mating connector 46 is shown, its upper surface characterized by a V-shaped recess 48, and having a abutting end face 50 characterized by alignment holes 52. Receiving in the recess 48 is the disposable light pipe 34. Also received in the connector 46 are threaded fasteners 54 which engage the tapped holes 44 of the connector 36. When assembled, the facing surfaces of the light pipes are in optical communication.

Figure 8:
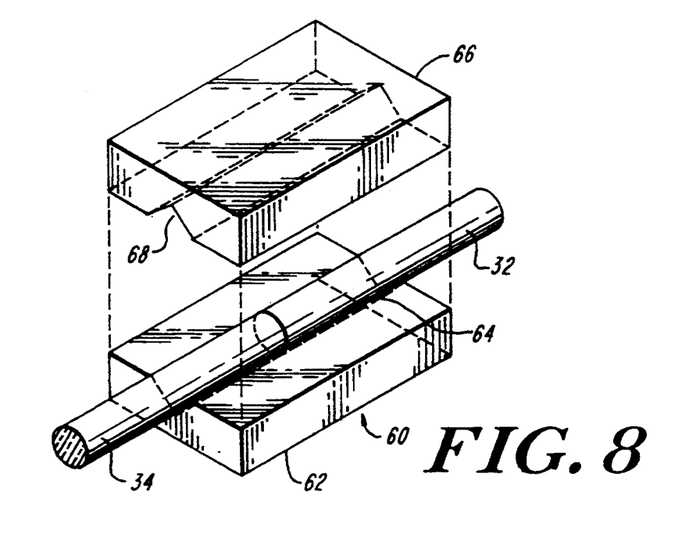
FIG. 8 is an illustration of an alternative disconnect.

Referring to FIG. 8, another embodiment of a quick disconnect is shown generally at 60 and comprises a bottom plate 62 characterized by a V-shaped recess 64. The depending light pipe 24 is permanently secured in the plate 62. A mating magnetized upper plate 66, having a V-shaped recess 68, is adapted to engage the plate 62. The end of the disposable light pipe 32 is received in the V-shaped groove 64 and engages the light pipe 32. The plate 66 maintains the connection between the two light pipes.

Figures 9A, 9B, 10, 11:
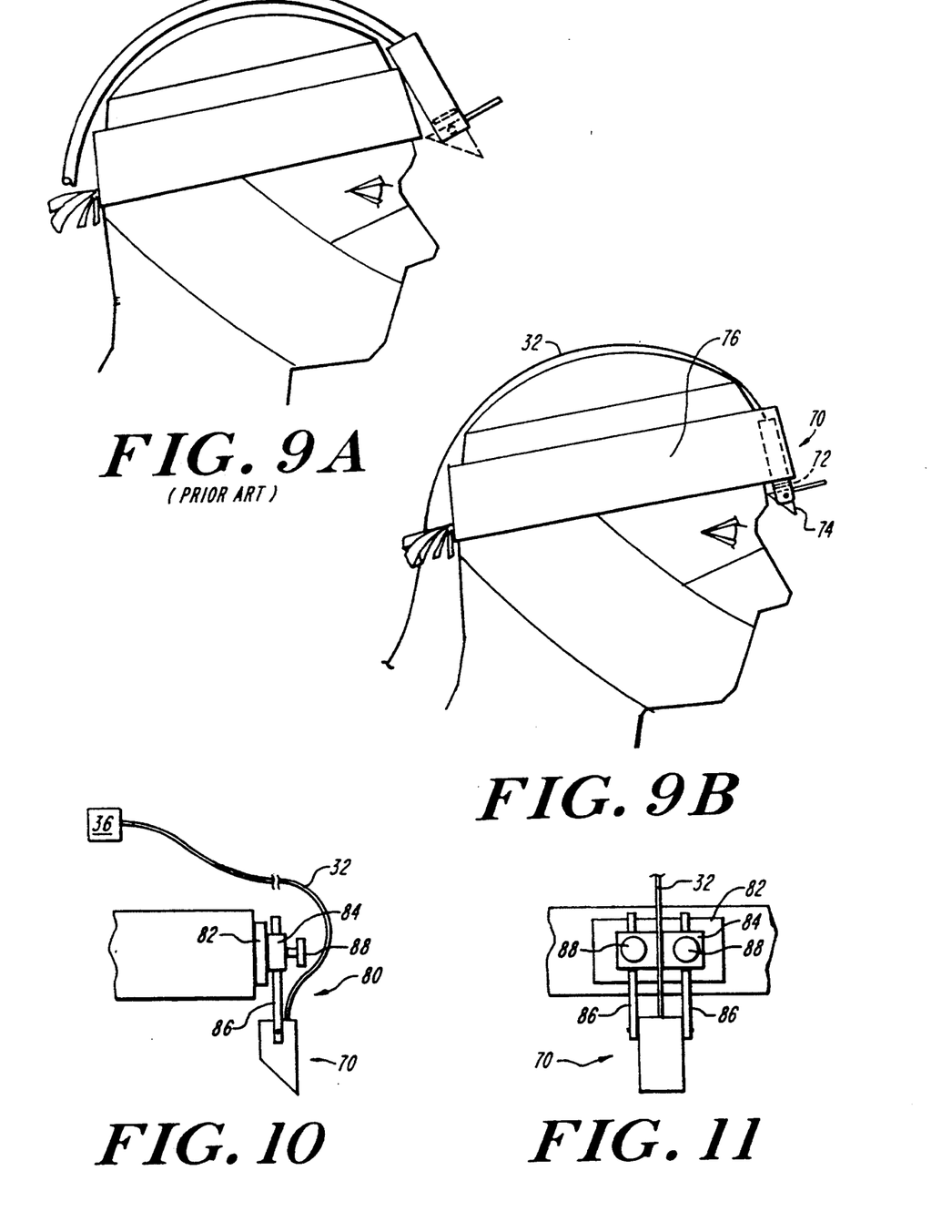
FIGS. 9a and 9b are illustrations of the size reduction achieved with the invention between the prior art beam-shaping optics, shown in dotted lines, and the beam-shaping optics of the invention.
FIG. 10 is a side illustration of distal end and beam-shaping optics secured to a surgeon's cap.
FIG. 11 is a front illustration of FIG. 10.

Referring to FIG. 9, the beam-shaping optics are shown generally at 70 and are basically the beam-shaping optics of the prior art, namely, a reflecting mirror 72 and focusing lens 74 both miniaturized.

Referring to FIG. 10, an assembly 80 to support the distal end of the disposable pipe 32 and the beam-shaping optics is shown generally at 80. Secured to the front of the disposable surgeon's cap, such as by gluing, is a patch 82. Secured to the patch 82 is a mounting block 84 slideably received in the mounting block 84 are a pair of posts 86 in parallel, spaced apart relationship. Set screws 88 locate the posts. The beam-shaping optics 70 is secured between and pinned to the posts in a moveable manner. This allows the surgeon to pivot the beam-shaping optics to adjust the spot angle.

Figures 12, 14:
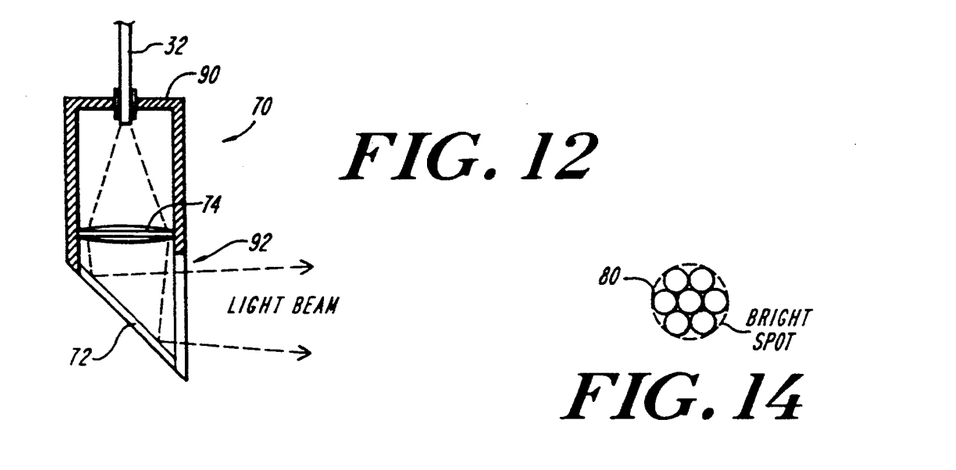
FIG. 12 is an illustration of beam-shaping optics.
FIG. 14 is a sectional view of FIG. 6 taken along lines 10—10.

Referring to FIG. 12, the beam-shaping optics is shown in greater detail and the distal end of the disposable light pipe 32 is received and secured in a plug 90. The plug, in turn, is secured in a sleeve 92 which terminates in an angled lower end 94. The lens 74 is secured in the sleeve, such as by gluing, and the mirror 72 is also secured in the sleeve, such as by gluing.

FIG. 10 also represents the disposable headlight system of the invention, i.e. quick disconnect 36, disposable pipe 32, surgeon's cap 76, the beam shaping optics 70 and the assembly 80.

Figure 13:
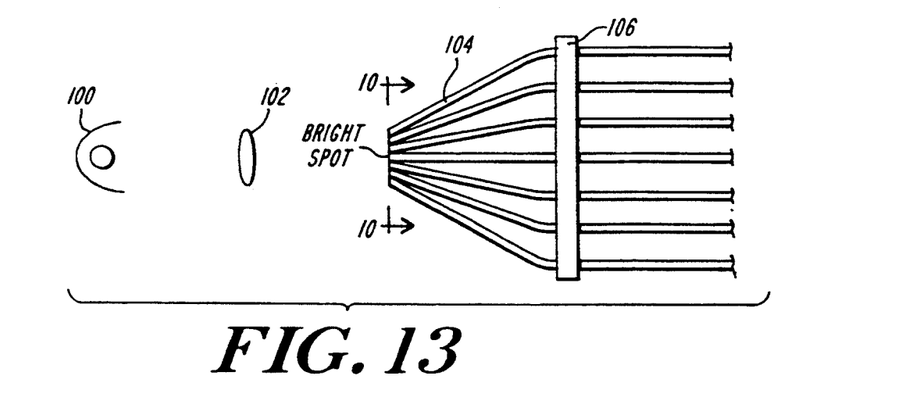
FIG. 13 is a schematic illustration of a light source in combination with a multifiber and a manifold to distribute the light to the long light pipes.

In a preferred embodiment of the invention, referring to FIGS. 13 and 14, the light source 10 includes an arc lamp 100 and a focusing lens 102 which focuses the light at the distal end of the multifiber 104. A typical array would comprise seven glass fibers having a numeral aperature of about 0.5 and a refractive index of about 1.6. The fibers are separated and secured in a manifold 106 and are subsequently dispersed to the same or different operating rooms. The long fibers connecting the manifold to the operating room are preferably low loss multi-mode fibers made by chemical vapor deposition comprising high purity silica with an index raising dopant which fiber is similar in composition to communications grade fiber but is multi-mode and has a higher numerical aperature, e.g. 0.5. Large fibers made commercially for delivery of powerful laser illumination have usually low enough loss for purposes of the invention. The manifold is typically machined from aluminum.

It would be expected that up to three light pipes would be provided to each of up to seven operating rooms. This is in excess of the number of pipes that can be illuminated by a single source; that is, seven pipes. The pipes actually selected for connectors (up to seven) would depend on which operating rooms were being used requiring headlights.

Figure 15:
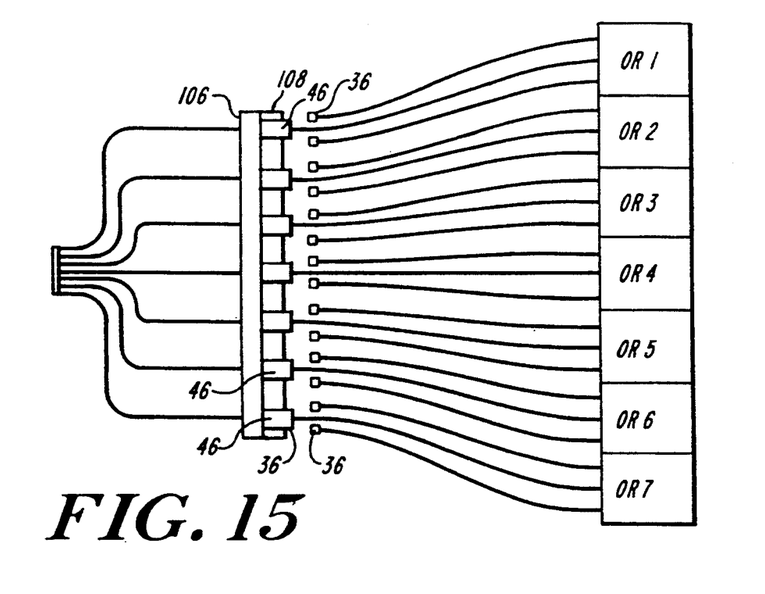
FIG. 15 is an illustration of a light pipe switching assembly.

In one embodiment of the system three pipes are provided to each of up to seven operating rooms as shown schematically in FIG. 15. This is in excess of the number of pipes that can be illuminated by one source. Therefore, a manual switching panel 108 is provided to easily connect or disconnect pipes to the assembly—but preferably manually—like an old-fashioned telephone switchboard when the operator plugged in the desired line. The structure of the quick disconnects described for FIGS. 6 and 7 would be suitable. The board 108 secures in place a plurality of connectors 46, FIG. 7. The associated light pipe ends comprise mating connectors 36, FIG. 6.

Figure 16:
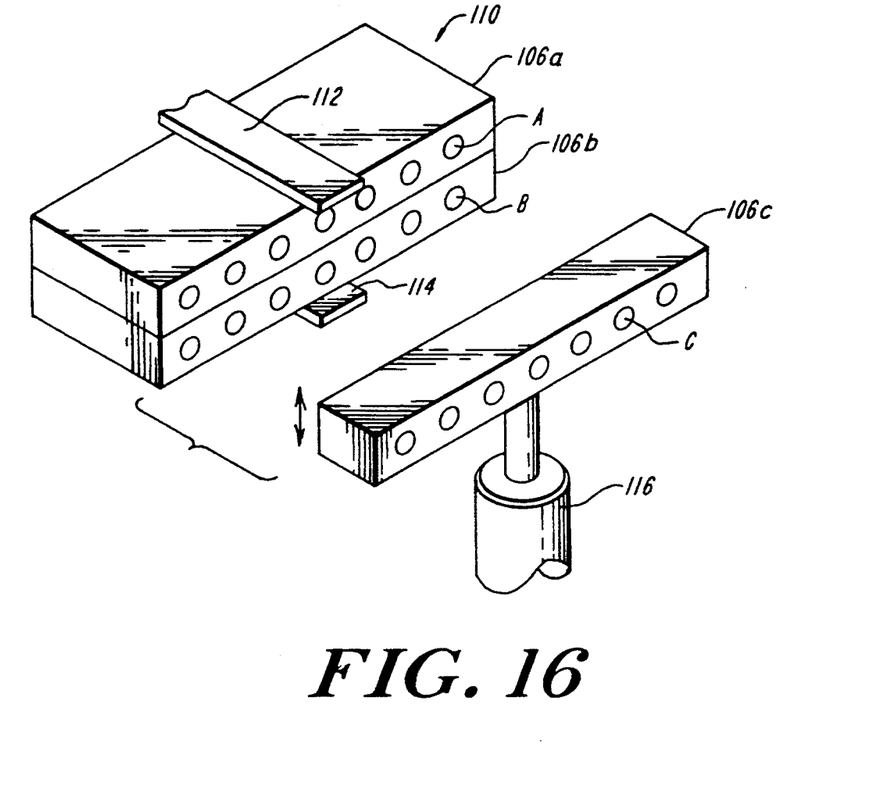
FIG. 16 is an illustration of a light source switching assembly.

Referring to FIG. 16, there is a dual manifold 110. Each of the manifolds 106a and 106b of the dual manifold 110 has its own light source. The manifold 106c is shown spaced apart from the manifold 110 for clarity. In practice, it butts the manifold 110. The manifold 106c includes a set of seven fibers, C, which match the fibers of A and B precisely when aligned. Fixed stops 112 and 114 are adjusted so that when the manifold 106c is in the up position the source manifold fibers A match fibers C and when in the down position the fibers C match the fibers B.

A hydraulic piston 116 drives the manifold 106c in a reciprocating fashion with a typical stroke in each direction of two to three millimeters. The distribution manifold 110 is approximately 300 millimeters so the angular motion is only about ½°.

The hydraulic piston preferably operates in response to an automated system. For example, the lower light source is initially turned on. A detector senses whether the source is actually on. If for any reason the lower source goes off, the sensor drives a system which turns on the upper source and causes the piston to move the manifold to its up position.

In an automated assembly, there is an intermediate link (not shown), such as an electromagnetic device, to move the manifold 106c between the two precisely aligned positions.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

I claim:

1. A surgeon's disposable headlight system which comprises:
   a surgeon's cap;
   a disposable light pipe having a proximal end and a distal end, the proximal end adapted to be placed in optical communication with a short arc xexon lamp light source, the distal end secured to the surgeon's cap;
   beam-forming optics secured solely to the surgeon's cap and in optical communication with the distal end of the light pipe, the light pipe being less than about 2 millimeters in diameter.

2. The system of claim 1 which includes:
   means to package the disposable headlight system in a sterile condition.

3. A surgeon's headlight system which comprises:
   a short arc xexon lamp light source;
   a light pipe having a proximal end in optical communication with the light source and a distal end in communication with beam-shaping optics;
   the light pipe comprising a first long section which is secured in a fixed elevated manner and a second tethered section which depends from the long section and defines along its length at least in part an umbilical;
   means to place the distal end in optical communication with the beam-shaping optics;
   means to secure the distal end to a surgeon's caps, which cap solely supports the beam-shaping optics wherein the illumination delivered by the system is not less than 2500 foot candles over a 3 inch diamater circle and the force acting surgeon's cap due to the light pipe is less than 10 grams of pull.

4. The system of claim 3 which comprises:
   means to disconnect the second tethered section to form a depending light pipe having a free end and a disposable light pipe, the distal end secured to the surgeon's headgear and the other end adapted to be connected to the free end.

5. The system of claims 3 or 4 which includes a plurality of light pipes in communication with the light source.

6. The system of claim 5 wherein the beam-shaping optics is less than 1 ½ centimeters in its longest dimension.

7. The system of claim 4 which comprises:
   a plurality of light pipes in communication with a single light source.

8. The system of claim 7 which comprises:
   means to switch the illumination among the light pipes.

9. The system of claim 7 which comprises:
   a plurality of light sources; and means to alternate between the light sources.

* * * * *